(12) United States Patent
Shin

(10) Patent No.: US 12,494,296 B2
(45) Date of Patent: Dec. 9, 2025

(54) INTEGRATED NUCLEAR REACTOR SYSTEM INCLUDING DOUBLE CONTAINMENT STRUCTURE USING LIQUID NITROGEN

(71) Applicant: KOREA HYDRO & NUCLEAR POWER CO., LTD, Gyeongju-si (KR)

(72) Inventor: Hye Young Shin, Daejeon (KR)

(73) Assignee: KOREA HYDRO & NUCLEAR POWER CO., LTD, Gyeongju-si (KR)

( * ) Notice: Subject to any disclaimer, the term of this patent is extended or adjusted under 35 U.S.C. 154(b) by 272 days.

(21) Appl. No.: 18/256,019

(22) PCT Filed: Jan. 18, 2022

(86) PCT No.: PCT/KR2022/000871
§ 371 (c)(1),
(2) Date: Jun. 5, 2023

(87) PCT Pub. No.: WO2022/169133
PCT Pub. Date: Aug. 11, 2022

(65) Prior Publication Data
US 2024/0071636 A1 Feb. 29, 2024

(30) Foreign Application Priority Data
Feb. 2, 2021 (KR) .......................... 10-2021-0014753

(51) Int. Cl.
*G21C 9/004* (2006.01)
*G21C 13/10* (2006.01)
(Continued)

(52) U.S. Cl.
CPC ............. *G21C 9/004* (2013.01); *G21C 13/10* (2013.01); *G21C 15/12* (2013.01); *G21C 15/18* (2013.01)

(58) Field of Classification Search
CPC ......... G21C 9/004; G21C 13/10; G21C 15/12
See application file for complete search history.

(56) References Cited

U.S. PATENT DOCUMENTS 4,064,005 A * 12/1977 Baujat .................. G21C 13/024
220/628
6,810,099 B2 10/2004 Nakamaru et al.
(Continued)

FOREIGN PATENT DOCUMENTS

JP 10-282284 A 10/1998
JP 2011-058866 A 3/2011
(Continued)

OTHER PUBLICATIONS

The Extended European Search Report for European Patent Application No. 22749887.0, dated Sep. 19, 2024.

Primary Examiner — Sharon M Davis

(57) ABSTRACT

The present invention relates to an integrated nuclear reactor system including a double containment structure using liquid nitrogen, the nuclear reactor system comprising: a reactor vessel; a reactor core disposed in the reactor vessel; a steam generator disposed in the reactor vessel and located above the reactor core; a first containment vessel surrounding the reactor vessel with a first space interposed therebetween; a second containment vessel surrounding the first containment vessel with a second space interposed therebetween; and a liquid nitrogen supply unit supplying liquid nitrogen into the second space.

4 Claims, 2 Drawing Sheets

(51) Int. Cl.
*G21C 15/12* (2006.01)
*G21C 15/18* (2006.01)

(56) References Cited

U.S. PATENT DOCUMENTS

| | | | |
|---|---|---|---|
| 9,318,225 | B2 | 4/2016 | Sato |
| 2009/0161812 | A1* | 6/2009 | Reyes, Jr. .............. G21C 13/00 376/277 |
| 2014/0105348 | A1* | 4/2014 | Lin-Hendel ............ G21C 15/18 376/282 |

FOREIGN PATENT DOCUMENTS

| | | |
|---|---|---|
| JP | 2015-078948 A | 4/2015 |
| KR | 10-2010-0077215 A | 7/2010 |
| KR | 10-1559017 B1 | 10/2015 |
| WO | 2014/031767 A2 | 2/2014 |

* cited by examiner

INTEGRATED NUCLEAR REACTOR SYSTEM INCLUDING DOUBLE CONTAINMENT STRUCTURE USING LIQUID NITROGEN

TECHNICAL FIELD

The present disclosure relates to an integrated nuclear reactor system including a double containment structure using liquid nitrogen.

BACKGROUND ART

Research on an integrated reactor or small modular reactor (SMR) in which a core and a steam generator are located in a reactor vessel is being actively conducted.

A pressurizing region for pressurizing water vapor is formed in the integrated reactor. When steam is overheated due to an abnormally high temperature caused by the occurrence of an abnormal transient state, etc. in the reactor, an abnormal overpressure is caused so that an accident such as explosion of a reactor vessel may occur.

In order to prevent an accident and the leakage of radioactive materials to the outside, it is necessary to efficiently cool overheated water vapor in a reactor vessel.

DISCLOSURE

Technical Problem

Therefore, the purpose of the present disclosure is to provide an integrated nuclear reactor system including a double containment structure using liquid nitrogen.

Technical Solution

In order to achieve the aforementioned purpose of the present disclosure, there may be provided an integrated nuclear reactor system including a double containment structure using liquid nitrogen, including: a reactor vessel; a reactor core positioned in the reactor vessel; a steam generator located in the reactor vessel and above the reactor core; a first containment vessel surrounding the reactor vessel with a first space interposed therebetween; a second containment vessel surrounding the first containment vessel with a second space interposed therebetween; and a liquid nitrogen supply unit for supplying liquid nitrogen to the second space.

The first containment vessel and the second containment vessel may be made of steel.

A pressurizing region for pressurizing water vapor may be formed in the upper portion of the reactor vessel, and the reactor vessel may include: a pressure release valve connecting the pressurizing region with the first space and discharging water vapor in the pressurizing region to the first space; and a recirculation valve located below the pressure release valve and taking the cooling water condensed in the first space back into the reactor vessel.

The liquid nitrogen supply unit may include: a liquid nitrogen supply unit located outside the second containment vessel; a connection unit connecting the liquid nitrogen supply unit and the second space; and a discharge valve connected to the upper part of the second containment vessel and discharging liquid nitrogen in the second space to the outside.

The first space may be empty or filled with nitrogen.

Advantageous Effects

According to the present disclosure, there may be provided an integrated nuclear reactor system including a double containment structure using liquid nitrogen.

MODE FOR DISCLOSURE

Hereinafter, the present disclosure will be described in more detail with reference to the accompanying drawings.

Since the appended drawings are only examples for describing the technology of the present disclosure in more detail, the technology of the present disclosure is not limited to the drawings. In addition, in order to explain a relationship between components, the size, spacing, etc. of the components may be exaggerated in the accompanying drawings.

Figure 1:
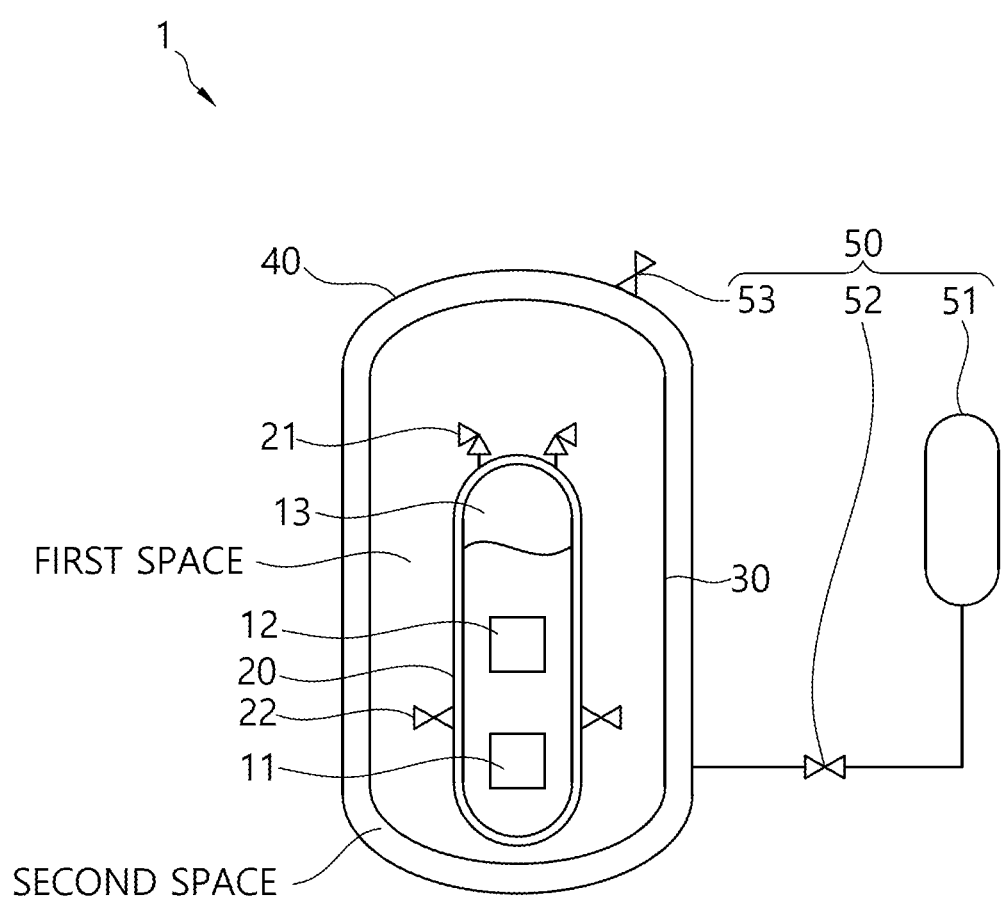
FIG. 1 shows an integrated nuclear reactor system according to an embodiment of the present disclosure.

FIG. 1 shows an integrated nuclear reactor system according to an embodiment of the present disclosure.

The integrated nuclear reactor system 1 may include a reactor vessel 20, a first containment vessel 30, a second containment vessel 40, and a liquid nitrogen supply unit 50.

Inside the reactor vessel 20, a reactor core 11, a steam generator 12, and a pressurizing region 13 may be located.

The reactor core 11 may be located at the bottom of the reactor vessel 20, and the pressurizing region 13 may be located at the top of the reactor vessel 20. The steam generator 12 may be located between the reactor core 11 and the pressurizing region 13.

In this embodiment, the feature that steam generated in the steam generator 12 is moved to the outside, a cooling device of the steam generator 12, etc. are not shown.

Cooling water may circulate in the reactor vessel 20 and cool the reactor core 11. In the pressurizing region 13, generated water vapor may be pressurized.

The reactor vessel 20 may have a pressure release valve 21 and a recirculation valve 22.

The pressure release valve 21 may be located on the reactor vessel 20 and discharge water vapor in the pressurizing region 13 to the outside when necessary.

The recirculation valve 22 may be located lower than the pressure release valve 21 and located on the side of the reactor vessel 20. Through the recirculation valve 22, condensed water in which water vapor is condensed may be supplied back into the reactor vessel 20.

The first containment vessel 30 may surround the reactor vessel 20 with a first space interposed therebetween. The second containment vessel 40 may surround the first containment vessel 30 with a second space interposed therebetween. The first containment vessel 30 and the second containment vessel 40 may be made of steel. Specifically, the first containment vessel 30 may be made of stainless steel, and the second containment vessel 40 may be made of carbon steel.

The first space may be empty or filled with air or nitrogen. Although not shown, the first space may further include a means such as a vacuum pump for maintaining a vacuum or a pump, tank, etc. for supplying air (or nitrogen).

In the case that the first space is empty or filled with nitrogen, even when hydrogen generated in the reactor vessel 20 is supplied to the first space due to damage to the reactor core, hydrogen explosion may be prevented because there is no oxygen in the first space.

The liquid nitrogen supply unit 50 may supply liquid nitrogen to the second space. The liquid nitrogen supply unit 50 may include an external liquid nitrogen supply unit 51, a connection unit 52 connecting the liquid nitrogen supply unit 51 and the second space, and a discharge valve 53 connected to the upper part of the second containment vessel 40 and discharging a nitrogen mixture in the second space to the outside.

The connection unit 52 may include a valve.

Although not shown, a controller for controlling opening and closing of the valves 21, 22, 52, and 53, etc. may be further included. In addition, a plurality of liquid nitrogen supply units 51 may be provided and connected in parallel.

In another embodiment, a plurality of integrated nuclear reactor systems 1 may be provided, and liquid nitrogen may be supplied thereto through a common supply unit.

As described above, the liquid nitrogen supply unit 50 may be provided in the form of an open circuit, but may also be provided in the form of a closed circuit in other embodiments.

Figure 2:
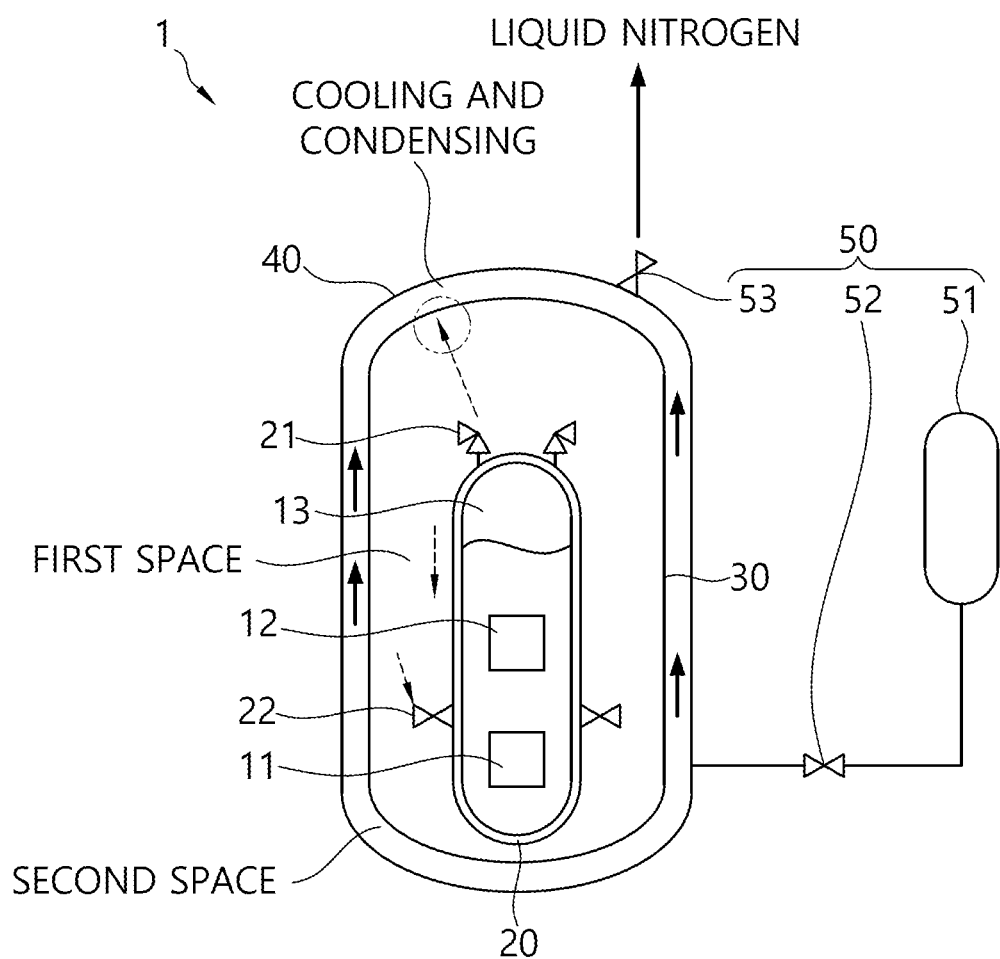
FIG. 2 shows the operation of the integrated nuclear reactor system according to an embodiment of the present disclosure.

Hereinafter, the operation of the integrated nuclear reactor system according to an embodiment of the present disclosure will be described with reference to FIG. 2.

When steam is abnormally overheated in the pressurizing space due to an accident or the like, the pressure release valve 21 may be opened and the steam may be discharged into the first space. The pressure release valve 21 may be opened when a certain pressure, for example, an internal pressure of approximately 2,500 psig is generated.

The second space may be normally filled with gaseous nitrogen in which the supplied liquid nitrogen is vaporized. Consequently, it may be possible to prevent heat generated in the reactor core 11 during normal operation from being moved to the first containment vessel 30 and being lost.

When abnormal symptoms occur (when the water vapor in the pressurizing space is abnormally overheated or the pressure in the reactor, the temperature of the reactor core, etc. increase abnormally), the entire second space may be gradually filled with liquid nitrogen by supplying the liquid nitrogen to the second space.

The first containment vessel 30 may be cooled to a low temperature by liquid nitrogen in the second space.

Water vapor discharged into the first space may be brought into contact with the inner surface of the first containment vessel 30 so as to be rapidly cooled and condensed into cooling water.

The converted cooling water may move downward by its own weight and may be supplied back into the reactor vessel 20 through the recirculation valve 22. The temperature of cooling water in the reactor vessel 20 may be lowered by the supplied cooling water. By virtue of such a circulation passage in which the process of cooling-reheating-vaporization-release-cooling is repeated, it may be possible to safely stop the nuclear reactor or perform continuous long-term cooling while preventing melting of the reactor core.

The recirculation valve 22 may be operated by controlling its opening and closing. For example, the recirculation valve 22 may be designed to open automatically or manually at time intervals in conjunction with the opening signal of the pressure release valve 21.

As a result of heat exchange on the inner surface of the first containment vessel 30, the temperature of liquid nitrogen in the second space may rise and some thereof may be vaporized. The vaporized liquid nitrogen may be discharged to the outside through the discharge valve 53. In order to replenish the lack of liquid nitrogen, liquid nitrogen may be further supplied from the liquid nitrogen supply unit 51. Liquid nitrogen may be replenished and discharged in the form of an open circuit as described above.

The discharge valve 53 may be driven passively, or its opening and closing may be controlled based on a result of measuring the temperature of the second space, etc.

According to the present disclosure above, it may be possible to cool the integrated nuclear reactor in the stable and efficient manner and to promptly respond in the event of an accident because liquid nitrogen in the second containment vessel may be used as a coolant so as to cool the integrated nuclear reactor more quickly with a much smaller amount of coolant compared to when using water in a water tank as a coolant. In addition, the double containment of the first containment vessel 30 and the second containment vessel 40 may make it possible to double-block radioactive materials in the event of an accident.

The above-mentioned embodiments are examples for describing the present disclosure, and the present disclosure is not limited thereto. Since the present disclosure can be practiced by a person having ordinary skills in the technical field to which the present disclosure belongs with various modifications therefrom, the technical scope of the present disclosure should be defined based on the appended claims.

The invention claimed is:

1. An integrated nuclear reactor system including a double containment structure using liquid nitrogen, comprising:
    a reactor vessel;
    a reactor core positioned in the reactor vessel;
    a steam generator located in the reactor vessel and above the reactor core;
    a first containment vessel surrounding the reactor vessel with a first space interposed therebetween;
    a second containment vessel surrounding the first containment vessel with a second space interposed therebetween; and
    a liquid nitrogen supply unit for supplying liquid nitrogen to the second space,
    wherein the liquid nitrogen supply unit includes:
        an external liquid nitrogen supply unit located outside the second containment vessel;
        a connection valve connecting the liquid nitrogen supply unit and the second space; and
        a discharge valve connected to an upper part of the second containment vessel and discharging liquid nitrogen in the second space to the outside.

2. The integrated nuclear reactor system of claim 1, wherein the first containment vessel and the second containment vessel are pressure vessels made of steel.

3. The integrated nuclear reactor system of claim 1,
    wherein a pressurizing region for pressurizing water vapor is formed in an upper portion of the reactor vessel, and
    the reactor vessel includes:
        a pressure release valve connecting the pressurizing region with the first space and discharging water vapor in the pressurizing region to the first space; and
        a recirculation valve located below the pressure release valve and taking cooling water condensed in the first space back into the reactor vessel.

4. The integrated nuclear reactor system of claim 1, wherein the first space is empty or filled with nitrogen.

\* \* \* \* \*